United States Patent [19]

Mechling et al.

[11] 4,111,676

[45] Sep. 5, 1978

[54] ADAPTATION OF GLASS SHAPING MEANS FOR TEMPERING FLAT GLASS

[75] Inventors: Charles H. Mechling, Galion; James B. Niedermier, Tiro; Norman J. Steber, Galion, all of Ohio

[73] Assignee: PPG Industries, Inc., Pittsburgh, Pa.

[21] Appl. No.: 810,331

[22] Filed: Jun. 27, 1977

[51] Int. Cl.² ............................................. C03B 27/00
[52] U.S. Cl. ............................ 65/114; 65/351; 65/104
[58] Field of Search .............. 65/104, 114, 349, 350, 65/351

[56] References Cited

U.S. PATENT DOCUMENTS

| | | | |
|---|---|---|---|
| 2,348,887 | 5/1944 | Drake | 65/106 |
| 3,223,498 | 12/1965 | Davidson, Jr. | 65/104 X |
| 3,245,772 | 4/1966 | Cypher et al. | 65/111 |
| 3,701,644 | 10/1972 | Frank | 65/106 |
| 3,801,298 | 4/1974 | Bezombes | 65/104 |
| 3,992,181 | 11/1976 | Frank | 65/104 |
| 4,028,086 | 6/1977 | Rahrig et al. | 65/273 |

FOREIGN PATENT DOCUMENTS 708,668  6/1941  Fed. Rep. of Germany ............ 65/114

*Primary Examiner*—Arthur D. Kellogg
*Attorney, Agent, or Firm*—Dennis G. Millman

[57] ABSTRACT

A continuous operation for heating, bending and tempering glass sheets is converted to tempering flat glass sheets by employing a heat-reflecting shield over the glass path in the unused bending zone. In the quenching zone, quenching medium is directed against the underside of the glass sheets with greater force than is customary, and driven hold-down rolls are employed above the glass path in the quench zone in order to maintain movement of the glass sheets through the quenching zone.

7 Claims, 3 Drawing Figures

ADAPTATION OF GLASS SHAPING MEANS FOR TEMPERING FLAT GLASS

BACKGROUND OF THE INVENTION

The present invention relates to the conversion of a glass sheet bending and tempering operation to a flat glass tempering operation. In particular, the invention deals with the modification of a conventional type of bending and tempering facility wherein a series of glass sheets are conveyed in a generally horizontal disposition through a heating chamber, bent to a desired curvature in a shaping station, and then rapidly cooled by blasts of tempering medium in a quenching station so as to impart a temper to the glass. A particular example of such a bending and tempering installation is disclosed in U.S. Pat. No. 3,701,644 which employs vertically reciprocating sets of shaping rolls for bending the glass sheets as they are continuously conveyed in a horizontal direction. It is occasionally desired to use the heating chamber and quenching means of such an installation to temper flat glass sheets without bending. The possibility of such an alternate use for a bending line is suggested in the above-mentioned U.S. Pat. No. 3,701,644, since in that arrangement straight conveyor rolls are provided in the bending zone, as well as the shaping rolls. However, in actual practice when flat glass sheets are conveyed through a shaping zone as taught by said patent, it has been found that the tempered glass sheets thus produced are often warped to such an extent that they are unacceptable for flat glazing applications. Thus, it has been highly desirable to find a way in which a horizontal glass sheet bending line could be economically used to temper flat glass sheets.

U.S. Pat. No. 3,245,772 to J. H. Cypher et al. discloses the imposition of unequal thermal conditions from the top surface to the bottom surface of a glass sheet in a heating furnace in order to deliberately bow the sheet as it passes through the furnace. Subsequently, in the quench zone an air pressure differential between top and bottom surfaces is maintained in order to flatten the sheet. Hold-down rolls are shown in the quench which press against the upper surface of a glass sheet passing therethrough.

In U.S. Pat. No. 3,801,298 to Bezombes there is shown an arrangement for bending and tempering glass sheets wherein the quenching zone includes curved rolls above and below the curved glass sheets being conveyed therethrough. The patent does not deal with the problem of maintaining the flatness of flat glass sheets being tempered.

U.S. Pat. No. 3,992,181 to Frank discloses application of air to balance the cooling rate of glass sheets being bent in a roll pressing operation.

SUMMARY OF THE INVENTION

It has now been found that a continuous horizontal glass bending line can be used to temper flat glass sheets with little or no warpage. The present invention involves, first of all, the discovery that the source of warpage was an unbalanced thermal condition produced by passage of the flat glass sheets through the unused bending apparatus and, secondly, the discovery of means to overcome this unbalanced thermal condition. The conveyor rolls in the bending section were found to accumulate heat from contact with heated glass sheets being passed thereover such that after a period of time the rolls become hot enough to retard the rate at which the bottom surface of the glass sheets cooled as they passed through the bending section. Since the upper surface of the glass sheets lost heat at a more rapid rate as they passed through the bending section, each glass sheet had a temperature differential from top to bottom as it entered the quench section, which resulted in the final product being warped.

The present invention employs two approaches to overcome this problem. The first is the use of a heat-reflecting shield above the path of the glass sheets through the bending zone so as to make the rate of heat loss from the top and bottom of the glass sheets more equal. A second measure used to balance the tempering conditions from top to bottom of each glass sheet is to control the flow rates of air in the quenching zone so as to cool the bottom surface of each glass sheet at a faster rate than the top surface of each glass sheet. In order to carry out this second aspect of the invention it has sometimes been found necessary to employ a set of driven conveyor rolls above the path of glass sheet travel through the quench zone because attainment of the higher heat transfer rate on the bottom side of the glass sheets can cause the glass sheets to rise up off the conventional bottom conveyor rolls.

DRAWINGS

DETAILED DESCRIPTION

Figure 1:
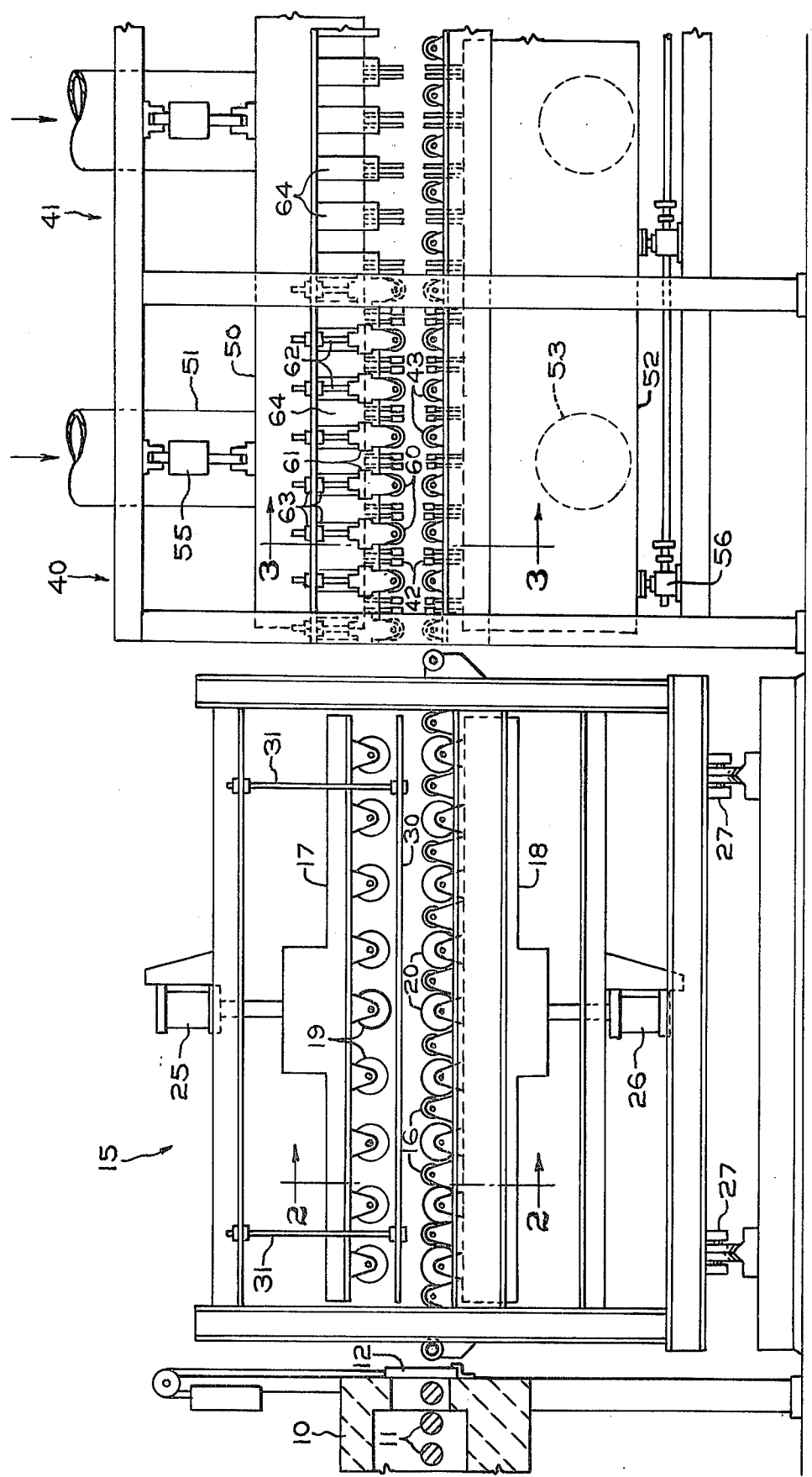
FIG. 1 is a side view of a specific embodiment of a bending and tempering line modified in accordance with the present invention to temper flat glass sheets.
Figure 2:
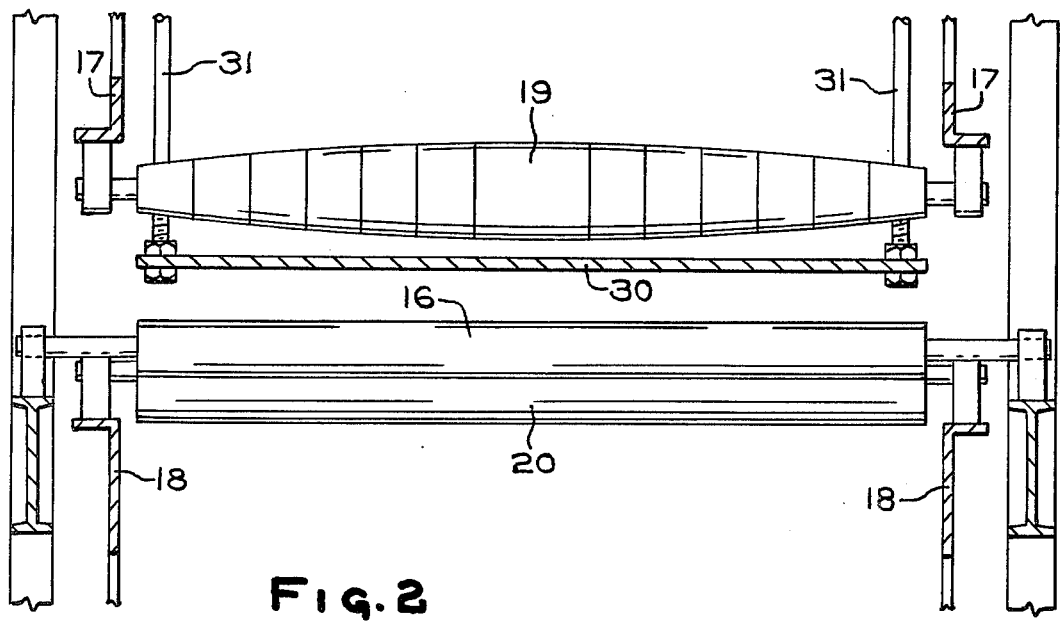
FIG. 2 is a cross-sectional view through the modified bending section along lines 2—2 in FIG. 1.
Figure 3:
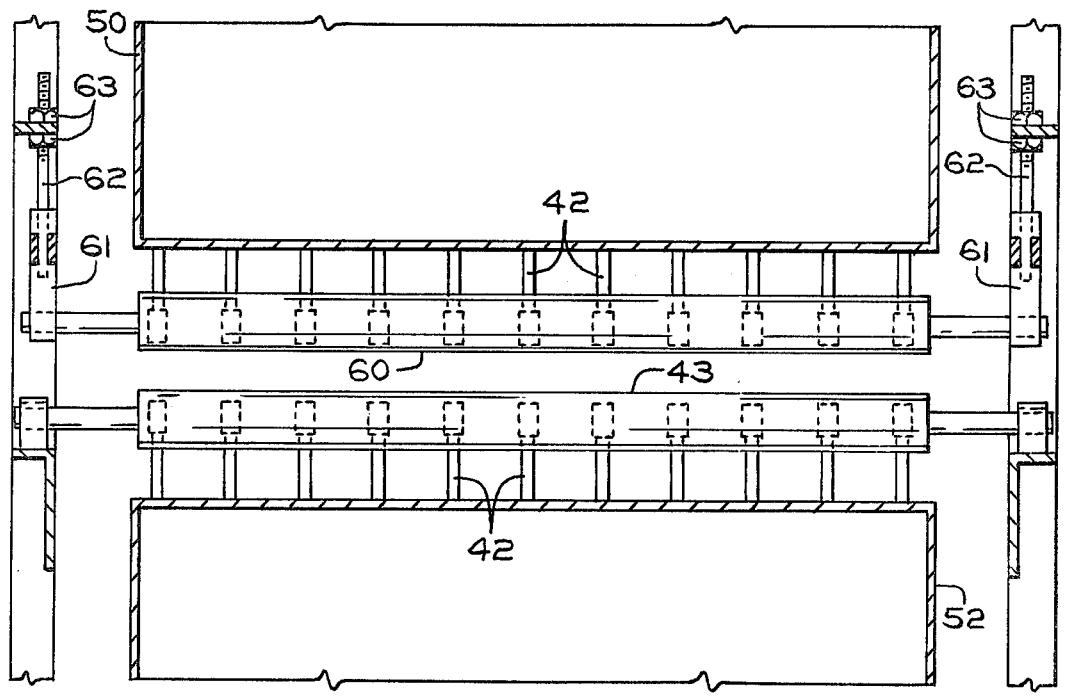
FIG. 3 is a cross-sectional view of the modified first quench section along 3—3 in FIG. 1.

In FIG. 1 there is shown in cross-section the exit end of a heating furnace through which glass sheets are continuously conveyed as they are heated. The supporting and conveying means for the glass sheets are shown as a set of rolls 11, but it should be understood that gas support means such as that shown in U.S. Pat. No. 3,223,501 to Fredley et al. may be used as well. A furnace door 12 is raised vertically to permit each glass sheet to pass from the furnace onto a set of conveyor rolls in a bending zone 15. The bending zone shown in FIG. 1 is of the type disclosed in U.S. Pat. No. 3,701,644 to Frank, the disclosure of which is hereby incorporated by reference. Because the details of such a bending apparatus can be obtained from said patent and do not form a part of the present invention, the bending section has been shown schematically in the drawings here for the sake of clarity. The bending apparatus basically consists of a stationary set of conveyor rolls 16 and upper and lower vertically reciprocable frames 17 and 18 respectively on opposite sides of the glass conveying path defined by the conveyor rolls 16. The frames 17 and 18 are adapted to carry forming rolls which have complementary curvatures along their axes corresponding to the desired curvature to be imparted in the glass sheets when the apparatus is being used for bending. The drawings show a set of upper forming rolls 19 in place with the upper frame 17 in its raised position. Because the present invention does not involve bending glass sheets, the upper forming rolls 19 do not function here and could be removed. As shown in the drawings, it is preferred that the lower forming rolls be removed and replaced by a set of straight rolls 20 to provide extra support for the hot glass sheets. The lower frame 18 is then locked is a raised position as shown. Pistons 25 and 26 provide the reciprocating motion to upper and lower frames 17 and 18 when used in the bending mode but are non-functioning in the present invention. The entire bending section is supported on caster means 27 which enable the alignment of the bending apparatus to be adjusted in the direction transverse to the direction of glass movement.

Thus, for the purposes of the present invention it can be seen that the bending apparatus functions as merely an intermediate conveyor between the furnace and the quenching zone. But it has been found that problems arise from the fact that the period of time required for each glass sheet to pass through the bending apparatus is longer than is usually desired to transfer glass sheets from a furnace to a quenching apparatus when tempering flat glass sheets. Because the conveyor rolls contact the undersides of the glass sheets, heat is transferred from the glass sheets to the conveyor rolls initially. After a relatively short period of time, the heat build-up in the rolls causes ambient temperatures encountered by the undersides of the glass sheets to be higher than that encountered by the upper sides of the glass sheets as they pass over the conveyor. The result is a higher rate of heat transfer from the upper surfaces of the glass sheets than from the bottom surfaces of the glass sheets, which in turn produces a temperature difference from top to bottom in the glass sheets. To offset this undesirable result, the present invention employs a heat shield 30 mounted above and closely adjacent to a substantial portion of the path of glass travel through the bending section. The heat shield is preferably a polished metal sheet such as aluminum or steel and may be supported from the surrounding structure by means of rods 31 in such a manner that the shield may be easily removed when the apparatus is to be used for bending. The heat shield serves to reduce heat loss from the top surface of glass sheets passing thereunder by reflecting heat back toward the glass sheets, by reducing convective heat losses, and by reradiating heat which it absorbs. In this manner, the rate of heat loss from the top surfaces of the glass sheets is made more equal to the rate of heat loss from the bottom surfaces of the glass sheets.

Each glass sheet is conveyed from the bending apparatus into an air quench station which may be comprised of a plurality of quench zones, only the first two of which are shown in FIG. 1, designated 40 and 41. Each quench zone has opposing arrays of upper and lower nozzles 42 for directing blasts of air at the opposite surfaces of the glass sheets passing through the quench zone. In the conventional mode of operation the glass sheets are supported on and conveyed by driven conveyor rolls 43 located between the lower rows of nozzles. Air is supplied to the upper set of nozzles by a plenum 50 and an air duct 51. Likewise air is supplied to the lower set of nozzles by a plenum 52 and an air duct 53. The upper section of the quench zone may be opened by means of a piston 55 for access to the space between the nozzles. Vertical adjustability is provided for the lower section of the quench zone by jack means 56.

Although the top to bottom temperature differential of glass sheets entering the quench station is substantially reduced by the use of the heat shield 30, it may not be completely eliminated in all cases. In that event, warpage of the glass may be substantially eliminated by cooling the bottom surfaces of the glass sheets at a more rapid rate than the upper surfaces of the glass sheets in at least the initial zone of the quench station. By thus cooling the bottom surface at a more rapid rate, the quenching produces substantially equal compressive forces at the opposite surfaces of the glass sheets. The most expedient way to increase the bottom cooling rate is to direct the quenching streams of air at the bottom surface of each glass sheet with an impact pressure greater than that at the upper surface of the glass sheet. The particular air pressures to be employed depend upon such factors as such glass temperature, air temperature, degree of temper desired, and air nozzle configuration and can be readily determined by those of ordinary skill in the art. As a minimum, the air flow should be sufficient to provide a heat transfer of at least 50 BTU/ft$^2$/hr/°F from either glass surface in order to achieve a commercially useful degree of temper in the glass. It has been found that the best results are obtained when the difference in air pressure from top to bottom side in the first zone of the quench is approximately of such a magnitude as to overcome the gravitational force of the glass sheets plus the downward force of the upper air blasts, such that the sheets occasionally are lifted up off the lower conveyor rolls 43 in the first quench zone. Another way of describing the top-to-bottom air pressure relationship is that the best results are obtained when the ratio of the top heat transfer rate to the bottom heat transfer rate is about 0.80 to about 0.95.

When a sheet loses engagement with the lower conveyor rolls 43 its forward progress also ceases, which is undesirable because the subsequent glass sheet may collide with the stopped sheet, resulting in breakage and a possible jam-up. Also, a sheet which becomes stalled in the quench may not be subjected to the proper quenching sequence. In order to overcome this glass floatation problem, a series of hold-down rolls 60 are provided on the upper side of the glass path through at least the first quench zone. These hold-down rolls 60 are driven in tandem by suitable means (not shown) such as a chain and sprocket arrangement so that when a glass sheet lifts off the bottom rolls 43 it is brought to bear against upper hold-down rolls 60, thereby maintaining its forward progress through the quench. Each hold-down roll is preferably located directly above a bottom roll 43 and the space therebetween is slightly greater than the thickness of the glass sheets being tempered. Each hold-down roll 60 is carried by a pair of vertically adjustable bearing holders 61 which are adapted to permit the hold-down 60 to be raised or lowered in accordance with the thickness of the glass sheets being processed. Each bearing holder is supported from a threaded rod 62 which may be raised or lowered by turning nuts 63 at the upper end thereof. Each bearing holder is slotted on the sides for sliding vertically in the space between a pair of guide plates 64.

The amount by which the space between opposed pairs of upper and lower rolls exceeds the glass thickness is preferably the minimum amount which will ensure the absence of a flattening or pinching force on the soft glass sheets, thereby avoiding a potential source of distortion in the glass. Thus, the elimination of warpage in the present invention is accomplished by thermal means solely and not by pressing of solid roll members against glass surfaces. A gap about 30 to 50% greater than the glass thickness has been found to be optimum in most cases.

EXAMPLE

In a glass tempering line having essentially the same configuration as that shown in the drawings, 3/16 inch thick glass sheets leaving the furnace at a temperature of about 1,185° to about 1,220° F. are then passed through a modified bending section about 104 inches long, where the top surface of each glass sheet lost at least approximately 60° to 70° F. The bottom surface cooled significantly slower while passing over the forming station such that prior to the modifications of the present invention warpage in the tempered sheets produced on the same line rendered the sheets unacceptable. After passing through the bending section, the glass sheets are conveyed into the quench station at a rate of about 630 inches per minute. The first quenching zone is about 4 feet in length, with both the conveyor rolls and the upper hold-down rolls 2 inches in diameter and spaced apart 8 inches from axis to axis. The lower conveyor rolls were made of Transite, an asbestos cement refractory material made by the Johns Manville Company, and the hold-down rolls were steel covered with glass fiber sleeves. The relative pressures in the top and bottom sets of nozzles are adjusted so as to yield a heat transfer rate at the top surface of the glass of about 72 BTU/ft$^2$/hr/°F and a bottom surface rate of heat transfer of about 81 BTU/ft$^2$/hr/°F. In order to produce the greater rate of heat transfer on the bottom, the air flow on the bottom was sufficient to occasionally float a sheet of glass into contact with the hold-down rolls. The tempered glass sheets thus produced met all applicable product standards for flatness and degree of temper.

We claim:

1. A method of tempering flat glass sheets wherein each flat glass sheet is conveyed into a heating chamber where the glass sheet is heated to a temperature suitable for tempering; the heated glass sheet is then removed from the heating chamber and conveyed through an elongated zone of essentially still, ambient air on a roller conveyor extending between the heating chamber and a quenching zone, whereby exposure to the ambient air while passing along the roller conveyor causes cooling of the upper surface of the glass sheet greater than the cooling of the bottom surface of the glass sheet such that a sufficient top-to-bottom temperature difference is produced to lead to subsequent warpage of the glass sheet; and then passing the glass sheet into the quenching zone where it is tempered by directing blasts of gaseous quenching medium onto the top and bottom surfaces;

wherein the improvement comprises retarding heat loss from the upper surface of the glass sheet while on said roller conveyor by means of a heat shield suspended above and closely adjacent to the upper surface of each glass sheet during a major portion of its travel along said roller conveyor, and controlling the relative rates at which the tempering medium is directed onto the top and bottom surfaces of each glass sheet in the quenching zone so as to produce a more rapid rate of cooling at the bottom surface than at the top surface, whereby tempered glass sheets substantially free from warpage are produced.

2. The method of claim 1 wherein the quenching medium is directed toward the lower surface of each glass sheet at sufficient pressure to lift the sheet off bottom conveyor rolls in the quenching means.

3. The method of claim 2 wherein movement of a glass sheet through the quench means is maintained when the sheet lifts off the bottom conveyor rolls by bringing the upper surface of the sheet into contact with a series of hold-down conveyor rolls above the glass sheets.

4. The method of claim 1 wherein the quenching medium flow rates in an initial quenching zone are controlled to maintain a ratio of upper glass surface heat exchange rate to bottom surface heat exchange rate of about 0.80 to 0.95.

5. The method of claim 4 wherein the heat exchange rate in the initial quenching zone is maintained for at least about 2 seconds at least about 50 BTU/ft$^2$/hr/°F at both glass surfaces.

6. A method of tempering flat glass sheets wherein each flat glass sheet is conveyed into a heating chamber where the glass sheet is heated to a temperature suitable for tempering; the heating glass sheet is removed from the heating chamber and passes into an intermediate zone of sufficient length to accommodate a glass sheet bending operation, the glass sheet being conveyed through said intermediate zone on a roller conveyor while exposed to relatively still, ambient air, whereby passage through said intermediate zone produces a temperature difference between the top surface and the bottom surface of the glass; and the glass sheet is then conveyed into a quenching zone where it is tempered by directing blasts of tempering medium onto the top and bottom surfaces of the glass sheet;

wherein the improvement comprises reducing the formation of the temperature difference in the intermediate zone by retarding heat loss from the upper surface of the glass sheet during its passage through the intermediate zone by means of a heat shield suspended above and closely adjacent to the path of the glass sheet during a major portion of its travel through the intermediate zone, and further offsetting thermal imbalances in the glass sheet by controlling the relative rates at which the tempering medium is directed onto the top and bottom surfaces of each glass sheet in the quenching zone so as to produce a more rapid rate of cooling at the bottom surface than at the top surface, whereby tempered glass sheets substantially free from warpage are produced.

7. An apparatus for tempering flat glass sheets comprising: a glass sheet heating furnace including means for heating a glass sheet to a temperature suitable for tempering, a glass sheet quenching station including means for directing blasts of gaseous tempering medium onto opposite sides of a glass sheet received therein so as to temper the glass sheet, said furnace and said quenching station being spaced apart by an intermediate zone of sufficient length to receive a glass sheet bending apparatus, said intermediate zone being open to relatively still ambient air and including a roller conveyor adapted to convey heated glass sheets from said furnace to said quenching station, a planar heat shield suspended over said roller conveyor closely adjacent to and overlying a major portion of the path taken by the glass sheet through said intermediate zone, a plurality of straight hold-down rolls extending transversely across the path of glass travel in the initial portion of the quenching station and spaced above bottom glass support means in the quenching apparatus a distance greater than the thickness of the glass sheet, and drive means for rotating said hold-down rolls in the direction of glass travel.

* * * * *